UNITED STATES PATENT OFFICE.

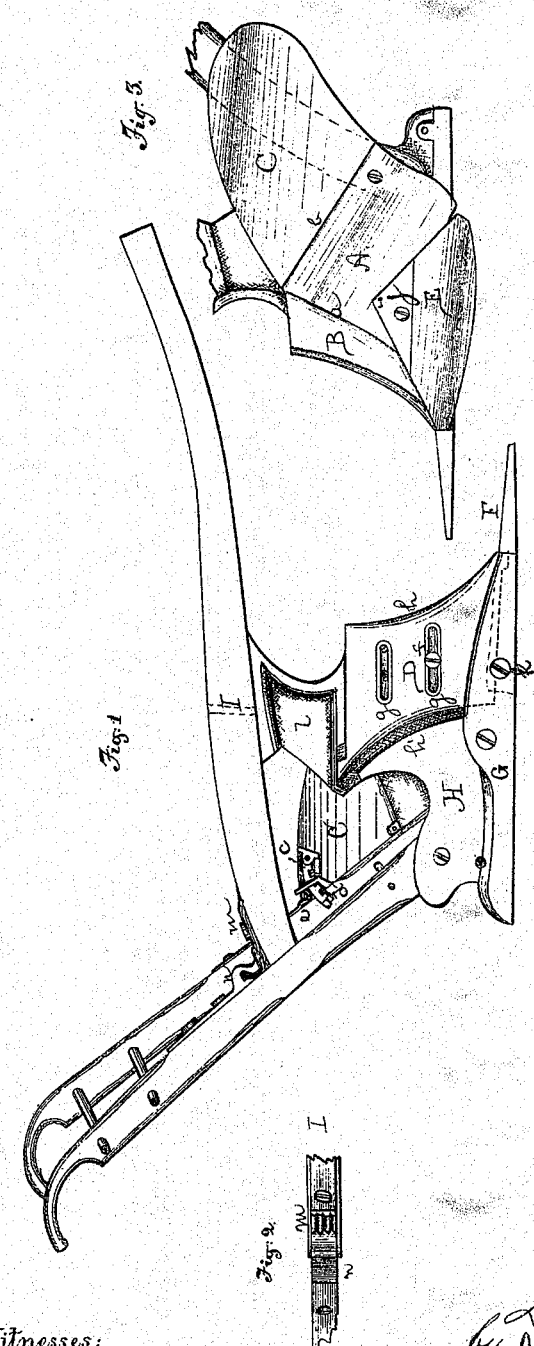

DANIEL HEIGES, OF CASHTOWN, PENNSYLVANIA.

IMPROVED PLOW.

Specification forming part of Letters Patent No. 100,624, dated March 8, 1870.

*To all whom it may concern:*

Be it known that I, DANIEL HEIGES, of Cashtown, in the county of Adams and State of Pennsylvania, have invented certain new and useful Improvements in Plows; and I do hereby declare the following to be a full, clear, and exact description of the invention, sufficient to enable others skilled in the art to which my invention appertains to make and use the same, reference being had to the accompanying drawings, in which—

Figure 1 is a side elevation, showing the landside and colter; Fig. 2, a detail view, to be hereinafter more fully referred to; Fig. 3, a side view, representing the mold-board and share.

This invention comprises the following features of improvement in plows: The mold-board is made in two parts, the lower one of which is rigidly attached and has the upper part hinged to it, so as to be adjusted to throw the furrow-slice uphill on elevated ground, or so as only to edge the ground up, a catch being provided to hold the hinged portion in the proper position.

The invention also consists in the combination of certain parts forming the share side of a plow. The front part of the mold-board, or an extension of the mold-board, but made separate from the parts already spoken of, is formed with or attached to the landside or standard, thus making provision for the attachment of a steel mold-board to a cast-iron landside.

In order that others may so understand my invention as to be able to make and use the improved plow, I now proceed to describe the various features in detail, referring to the drawings, wherein similar letters indicate like parts in the several figures.

A represents the main part of the mold-board, which will generally be made of steel, and attached in any suitable manner to the landside and plow-handle. The surface B, cast with the landside, forms the front part of the mold-board, *a* representing the dividing-line between the parts A B. The upper portion, C, of the mold-board is hinged to the part A at the line *b*, and has pivoted or hinged to it an arm, *c*, as shown in Fig. 1, provided with a series of notches which engage with a hook, *d*, fixed in the handle of the plow. A spring, *e*, presses on this notched arm, to hold it in engagement with the hook. By this means the upper portion of the mold-board can be so adjusted as to throw the furrow-slice uphill on elevated ground, or so as only to "edge" the ground up, by drawing in the hinged part toward the plow or throwing it out, as may be required. The cutter or colter D is made in about the form shown, and is adjustable, being held to the landside by a screw or screws, *f*, passing through a slot or slots, *g*, so that the extension of the colter or cutter beyond the mold-board in front can be lengthened or shortened. The cutter is reversible, its two edges, *h h'*, being similar, so that when one edge has become dull or worn out the other can be presented forward until the colter is entirely used up. The share E is attached on the outer side of the mold-board instead of underneath. It is made in about the form shown, and is self-sharpening and reversible.

*j* is a triangular plate, fitting a recess of the same form, of which there are two, one in each face of the share. The outer surface of this plate is flush with the face of the mold-board. The plate *j* prevents that part of the share underneath it from wearing.

F represents the plow-point, which is made tapering, and so that it can be used with either face uppermost. It is thus rendered self-sharpening. The point is formed with a shank, (shown in dotted lines, Fig. 1,) and is fastened by a bolt, *k*, through the landside, instead of through the mold-board, as is the case with most other plows. Thus the nut of the bolt *k*, being on the inner side, is protected from being knocked loose by stones. The heel G of the landside is made separate from the landside and bolted thereto, so that when the heel wears out a new one can be attached to the old landside. The landside H is cast with the part *l*, which is made fast to the beam I of the plow. A recess is also formed in this casting for receiving the colter, and a part of the mold-board above described is also a portion of the same casting. On the top of the beam, at its rear end, is fixed a casting, *m*, having on its upper surface a series of ridges, as shown in Fig. 2.

*n* is a flat spring or casting, attached to the plow-handle, and having notches in its free end, which correspond with ridges in plate *m*. The beam-casting has a concave surface at its rear end, as shown in Fig. 1, and the casting *m* has a corresponding convexity. By loosening the bolt which fastens the handle-casting, the beam can be shifted either way, being pivoted to the part $l$, cast with the landside. The object of this improvement is to make a narrower or wider furrow, as desired. When the beam is shifted to the landside, the furrow will be wider, and when shifted toward the mold-board the furrow will be narrower, than when the beam is in its usual position. The concave and convex surfaces of the beam-casting and handle-casting, respectively, being in contact, the parts will remain firm without additional bolting.

Constructed as above described, a plow is produced which can be adjusted to suit different situations and varieties of work for which a number of plows of peculiar construction are usually required. As it is made principally of cast metal it can be furnished at a slight advance upon the cost of common plows, and when any one part becomes useless from wear a new one can be applied at a reasonable expense, the parts not exposed to wear remaining as good as new for all practical purposes.

The manufacturer or dealer will keep on hand duplicates of the several parts, so that they can be furnished separately when application is made.

Having thus described my invention, what I claim as new, and desire to secure by Letters Patent, is—

1. The part C of the mold-board, hinged to the part A, for the purpose specified, and provided with the pivoted notched arm $e$, which is kept in engagement with the hook $d$ by means of a spring, $e$, substantially as herein described.

2. The reversible share E, plate $j$, main part A, hinged part C, and part B, combined together and forming the share side, substantially as described.

3. The landside cast or formed with the part $l$, a recess for the colter, and with the portion B of the mold-board, substantially as herein described.

The above signed by me this 31st day of August, 1869.

DANIEL HEIGES.

Witnesses:
ROBERT McCLEAF.
J. F. SOMES.